United States Patent [19]

Miyazawa et al.

[11] 4,205,509
[45] Jun. 3, 1980

[54] POWER TRANSMISSION DEVICE FOR POWER-OPERATED LAWN MOWING MACHINE

[75] Inventors: Takeshi Miyazawa, Wako; Kenji Nakamura, Asaka, both of Japan

[73] Assignee: Honda Giken Kogyo Kabushiki Kaisha, Tokyo, Japan

[21] Appl. No.: 946,798

[22] Filed: Sep. 28, 1978

[30] Foreign Application Priority Data

Oct. 5, 1977 [JP] Japan .......................... 52-134113[U]

[51] Int. Cl.² ...................... A01D 69/08; A01D 69/10
[52] U.S. Cl. ...................................... 56/11.3; 192/14; 192/18 R; 192/93 A
[58] Field of Search ............ 56/11.3; 192/12 R, 18 R, 192/14, 89 A, 93 A, 107

[56] References Cited

U.S. PATENT DOCUMENTS

| 2,446,138 | 7/1948 | Lambert | 192/93 A |
| 2,825,434 | 3/1958 | Smitzer | 192/18 R |
| 2,931,476 | 4/1960 | Zeidler et al. | 192/93 A |
| 3,099,338 | 7/1963 | Urquhart | 192/18 R |
| 3,209,873 | 10/1965 | Suzuki | 192/18 R |
| 3,253,391 | 5/1966 | Meldahl | 192/12 R |
| 3,613,815 | 10/1971 | Meylink et al. | 192/18 R |
| 3,871,159 | 3/1975 | Shriver | 192/18 R |
| 4,141,439 | 2/1979 | Lunde et al. | 56/11.3 |

Primary Examiner—Louis G. Mancene
Assistant Examiner—Paul J. Hirsch
Attorney, Agent, or Firm—Polster, Polster and Lucchesi

[57] ABSTRACT

A power transmission device for a power-operated lawn mowing machine, in which a rotational shaft for a prime mover and a rotational shaft for a cutting blade are interlocked with a friction clutch to be engaged and disengaged each other by an operating lever, and a disc brake to apply braking action to the cutting blade at the time of the clutch disengagement is provided between the movable engaging member of the clutch and a fixed member at the side of the prime mover.

8 Claims, 15 Drawing Figures

1

POWER TRANSMISSION DEVICE FOR POWER-OPERATED LAWN MOWING MACHINE

BACKGROUND OF THE INVENTION

This invention relates to a lawn moving machine, and, more particularly, it is concerned with a power transmission device for the lawn mowing machine, in which the grass cutting blade is driven by an internal combustion engine or an electric motor.

In this type of the lawn mowing machine, most of injuries caused to operators during its use is due to the cutting blade in rotation. For the safety measures against such possible danger of injury, there have so far been developed various devices such that a switch is provided at a position of the handle grip so that it may be closed simultaneously with gripping of the handle, and the prime mover continues to be operated so far as the handle is kept gripped, and when the operator leaves his hands off the handle, the prime mover is stopped.

In the abovementioned safety device, however, when it is necessary for the operator to leave his hands off the handle very often, the lawn mowing machine operated by the internal combustion engine should be re-started at every time the engine is stopped, and, at the same time, such starting operation should be effected at the gripping position of the handle with the consequence that the engine starting device become complicated. In the case of the lawn mowing machine operated by the electric motor, frequent start and stop of the electric motor impair the durability of the electric motor.

SUMMARY OF THE INVENTION

In view of the abovementioned point, the present invention is to provide a power transmission device excellent in its safety and easy in its operation, wherein the cutting blade instantaneously stops when the operator leaves his hands off the handle, while the prime mover continues its rotation.

According to the present invention, generally stated, there is provided a power transmission device for a power-operated lawn mowing machine, comprising in combination: (a) a machine body; (b) a prime mover mounted on one part of the machine body; (c) a rotational shaft for the prime mover; (d) a concentric shaft rotatably fitted around said rotational shaft for the prime mover at the bottom part thereof; (e) a cutting blade fixedly secured to the concentric rotational shaft; (f) a pair of frictional clutch means, one of which is fixedly secured to the prime mover shaft, and the other of which is fixed onto the concentric rotational shaft around the prime mover shaft in a manner to be integrally rotatable with the concentric rotational shaft and movable in the axial direction of the shaft; (g) spring means to urge the rotational clutch means upward toward the fixed clutch means; (h) disc brake means fixedly secured to the movable engaging member of the pair of the clutch means; (i) a cam plate fixed around the prime mover shaft in a rotatable manner; (j) a fixed braking disc secured to the cam plate; (k) a plurality of circumferential grooves formed in the surface part of the cam plate facing the disc brake means; (l) retainer means to hold therein a plurality of protrusions to be engaged with the cam grooves, the retainer means being provided between the cam plate and the rotational disc brake means, and being connected with an operating lever through an operative flexible wire for engaging and disengaging the clutch means; (m) a drive pulley provided on the prime mover shaft and a driven pulley provided on one part of a wheel axle of the lawn mowing machine; and (n) a pulley belt extended between the drive and driven pulleys.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawing, forming a part of the specification, in which.

Figure 4:
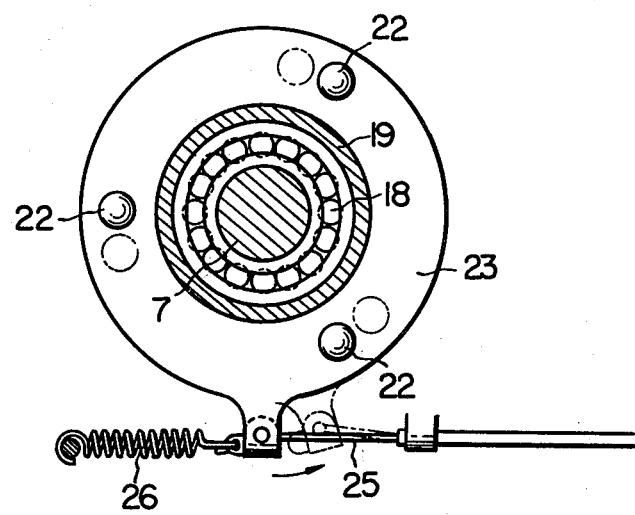
FIG. 4 is a top plan view of a ball retainer.
Figure 5:
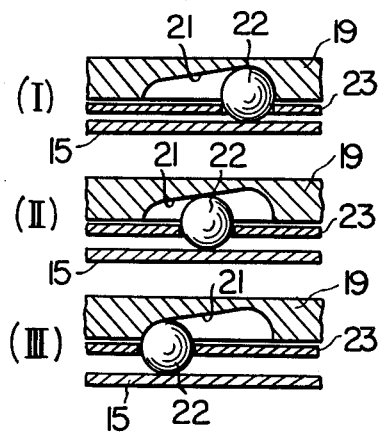
Figure 6:
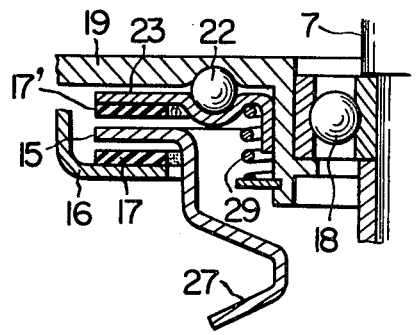
Figure 7:
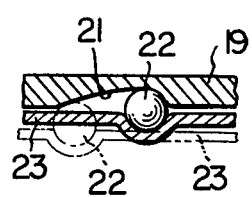
Figure 9:
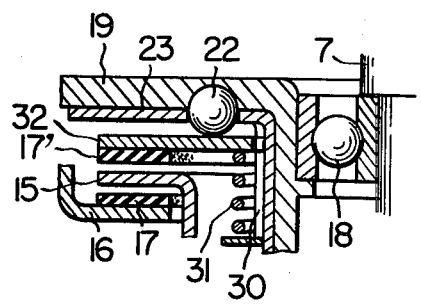
Figure 8:
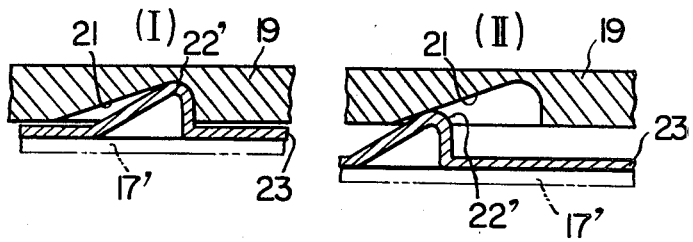
Figure 10:
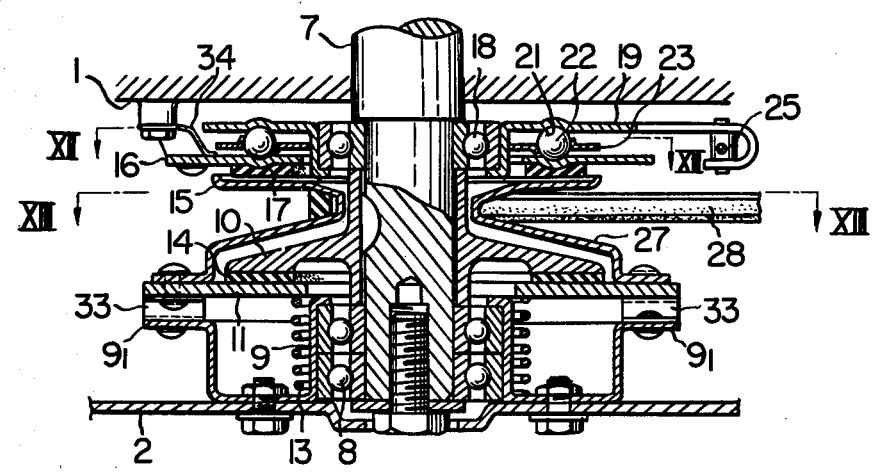
Figure 11:
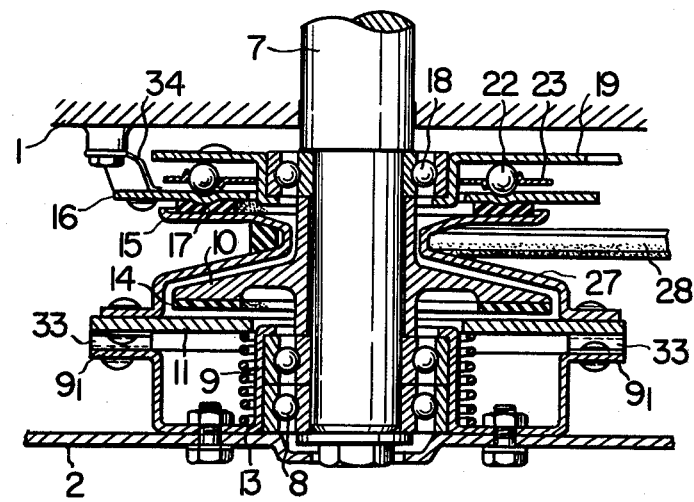
Figure 12:
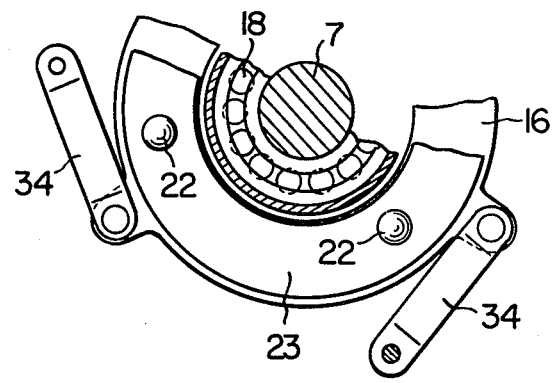
Figure 13:
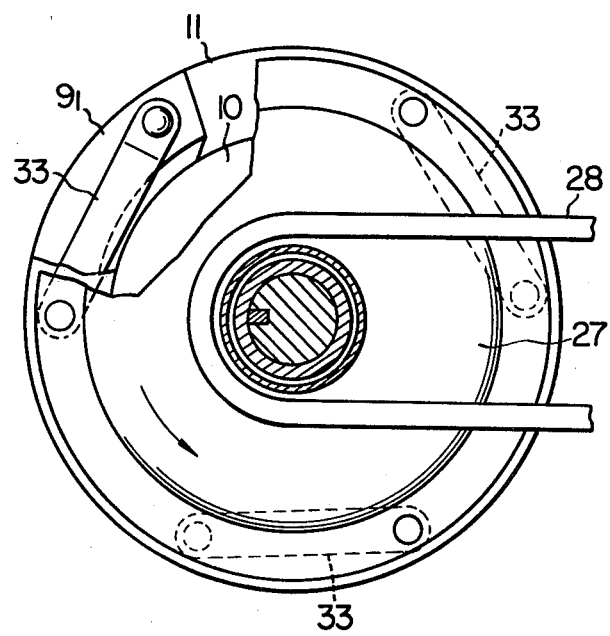
Figure 14:
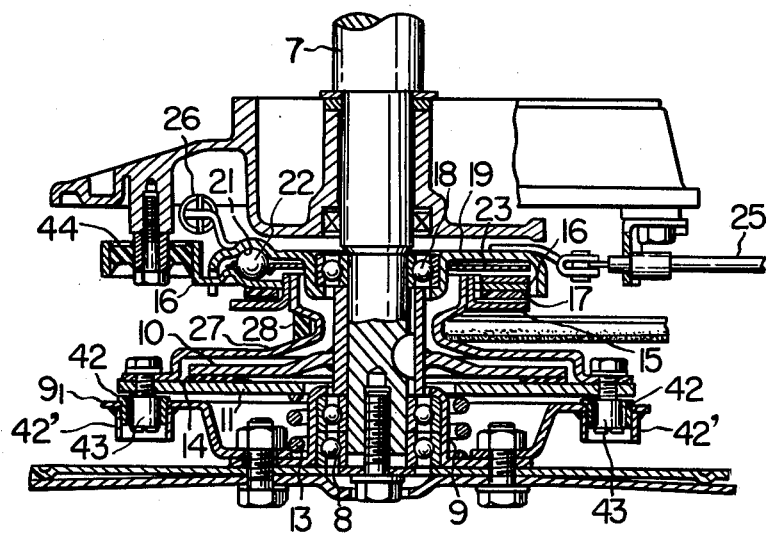
Figure 15:
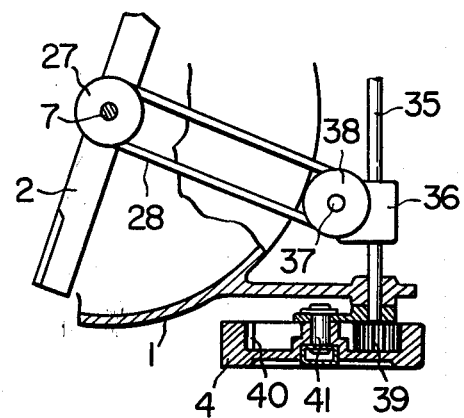

FIGS. 5(I), 5(II) and 5(III) are explanatory diagrams of the operations of the ball retainer shown in FIG. 4 above;

FIGS. 6 and 9 are enlarged longitudinal cross-sectional front views of the main part of other embodiment of the ball retainer;

FIG. 7 is a longitudinal cross-sectional side view showing a relationship between a cam plate and the ball retainer;

FIGS. 8(I) and 8(II) are explanatory diagrams of the operation of the retainer when a projection is formed in place of the ball;

FIG. 10 is a longitudinal cross-sectional front view showing a state of the clutch engagement in other embodiment of the device according to the present invention;

FIG. 11 is also a longitudinal cross-sectional front view showing a state of the clutch being disengaged;

FIG. 12 is a cross-sectional plan view taken along the line XII—XII in FIG. 10;

FIG. 13 is a cross-sectional plan view, partly cut away, taken along the line XIII—XIII in FIG. 10;

FIG. 14 is a longitudinal cross-sectional front view of a modified embodiment of the device shown in FIG. 10; and FIG. 15 is a plan view, partly in cross-section, of a part of the wheel power transmission mechanism.

DETAILED DESCRIPTION OF PREFERRED EMBODIMENTS

Figure 1:
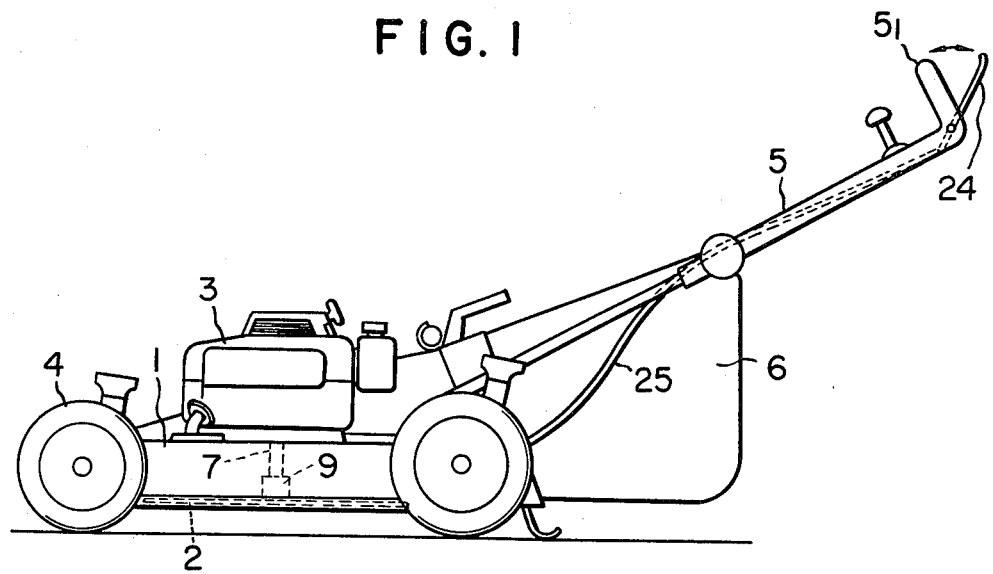
FIG. 1 is a schematic side elevational view of a rotary type power-operated lawn mowing machine provided with the power transmission device according to the present invention.

In the following, detailed description will be given as to the power transmission device for the lawn mowing machine according to the present invention as incorporated in the rotary type lawn mowing machine. Referring first to FIG. 1, a reference numeral 1 designates an inversed cup- or pot-shaped machine body which surrounds the grass cutting blade 2. A reference numeral 3 designates a prime mover disposed on an upper surface part of the machine body 1. A reference numeral 4 designates wheels of the lawn mowing machine. A numeral 5 refers to a steering handle. A numeral 6 refers to a grass collecting bag.

Figure 2:
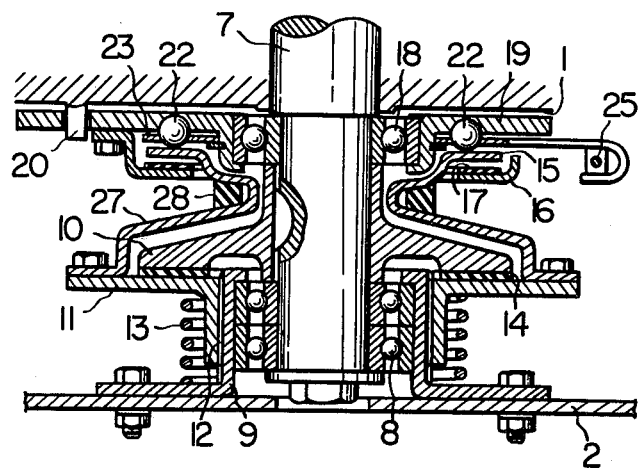
FIG. 2 is a front view, partly in longitudinal cross-section, of the power transmission device in a state of the clutch being engaged.

At the outset, explanations will be given on the embodiment shown in FIG. 2. A rotational shaft 9 for a cutting blade is fitted in a manner to be freely idling around the bottom end of a shaft 7 for the prime mover through bearings 8, and a cutting blade 2 is fixedly secured to this shaft 9. An engaging member 10 of a friction clutch is fixedly secured to the prime mover shaft 7, and the other engaging member 11 thereof is fixed onto the rotational shaft 9 for the cutting blade by a spline 12 in a manner to be integrally rotatable with the shaft 9 as well as movable in the axial direction thereof. Around this movable engaging member 11, there is provided a clutch spring 13 which is so energized as to constantly press-contacting toward the engaging member 10 at the fixed side. A reference numeral 14 designates a frictional material unmovably placed on the contact surface between both engaging members 10 and 11.

A rotational disc 15 of a disc brake is integrally fixed to the movable engaging member 11 of the abovementioned friction clutch so as to maintain a relationship such that the rotational disc 15 may be in contact with a fixed braking disc 16 provided on the lower surface of the machine body 1 at the time of separation of the frictional clutches 10 and 11. A reference numeral 17 designates a frictional material fixedly placed on the surface of the fixed braking disc 16. A cam plate 19 is fixed around the prime mover shaft 7 beneath the lower surface of the machine body 1 through bearings 18. A reference numeral 20 designates a projection for stopping rotation of the cam plate 19, which projects downward from the lower surface of the machine body 1 to be engaged with a part of the cam plate 19. In the illustrated embodiment, the fixed braking disc 16 is secured to the cam plate 19, although it can also be fixed to the machine body 1 per se.

A plurality of circumferential cam grooves 21 are formed in the surface of the cam plate 19 facing to the rotational disc 15, and a retainer 23 which holds therein a plurality of balls 22 to be engaged with the abovementioned cam grooves 21 is fitted between the cam plate 19 and the rotational disc 15 in a manner to be rotatably reciprocable in the circumferential direction.

When the abovementioned ball retainer 23 is connected with an operating lever, e.g., a clutch lever 24, provided in the vicinity of a gripping section $5_1$ of the steering handle 5 by a flexible wire 25, and the clutch lever 24 is gripped together with the gripping section $5_1$, the ball retainer 23 is rotated against force of a return spring 26 in the direction, in which the balls 22 are guided to a deeper side of the cam grooves 21.

When the prime mover 3 is started, and the clutch lever 24 is firmly gripped together with the handle grip section $5_1$, the retainer 23 is rotated as shown by a dash line in FIG. 4 through the flexible wire 25, and the balls 22 are moved to the deepest position in the cam groove 21 as shown in FIG. 5(I).

Upon movement of the balls 22, the movable engaging member 11 and the rotational disc 15 integral with it are pushed up by force of the clutfh spring 13, and the movable engaging member 11 is press-contacted to the engaging member 10 at the fixed side, and, at the same time, the rotational disc 15 is separted from the fixed brake disc 16. In other words, rotation of the prime mover shaft 7 is transmitted to the cutting blade 2 by engagement of the friction clutches 10 and 11.

In the above-described state, the machine body 1 is pushed forward, or the wheels 4 are self-driven by transmitting thereto the driving power from the prime mover shaft 7. While the power transmission mechanism to the wheels 4 may be of any type, the illustrated embodiment is so constructed that a member 27 connecting the movable engaging member 11 of the clutch and the rotational disc 15 of the brake is used for the prime mover pulley, and a wheel driving belt 28 is extended between this primer mover pulley and a driven pulley 38 integral with an input shaft 37 of the travelling-clutch-cum-speed-reduction machine 36 provided on the driving shaft 35 of the wheels 4, as shown in FIG. 15. In more detail, when the grass cutting blade 2 begins to rotate, the wheels 4 rotate on the shaft 41 as the center of rotation in the routing of the priming pulley 27→belt 28→the driven pulley 28→the travelling-clutch-cum-speed-reduction mechanism 36→the driven shaft 35→a small gear 39→inner gear 40, and the wheels 4 rotate with the shaft 41 as its center of rotation, whereby the lawn mowing machine begins to move. When the travelling clutch 36 is disconnected by operating a lever near at hand, the power transmission to the wheels 4 is disconnected, while the cutting blade 2 is being rotated, whereby the hand-pushing type lawn mowing machine becomes realized.

When the operator leaves his hands off the steering handle 5, the retainer 23 returns to the solid line position in FIG. 4 by the force of the return spring 26, on account of which the clutch lever 24 returns to its original position, and the balls 22 move as shown in FIGS. 5(II) and 5(III) to reach the shallowest position in the groove 21. The up-and-down movement of the disc 15 by the rotational movement of the balls 22 and retainer 23 results in such advantage that frictional force to the disc 15 is small, and the operation can be performed with the slightest force.

Figure 3:
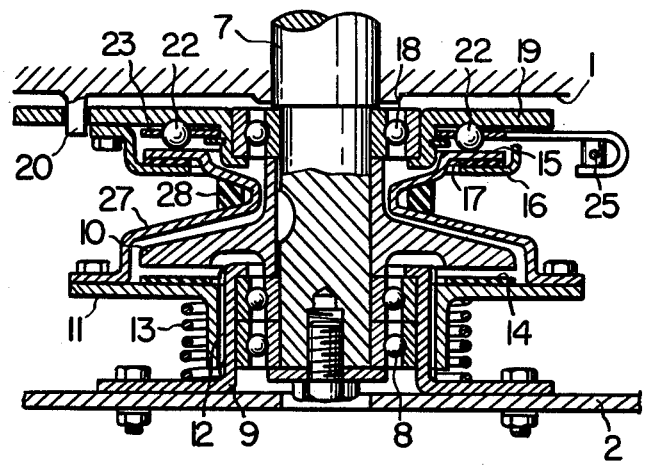
FIG. 3 is also a front view, partly in longitudinal cross-section, of the power transmission device in a state of the clutch being disengaged.

Then, the balls 22 are pushed down into the cam groove 21 by the wedging action, on account of which the rotational disc 15 and the movable engaging member 11 are also pushed downward against force of the clutch spring 13, whereby the movable engaging member 11 is separated from the fixed engaging member 10, as shown in FIG. 3, i.e., the clutch is disengaged, the rotational disc 15 is urged to the fixed braking disc 16 to function as the brake, and the cutting blade 2 stops, while the prime mover shaft 7 is in rotation. With stoppage of the cutting blade, the wheels 4 also stops in the case of the illustrated wheel transmission mechanism. The disc brakes 15 and 16 are so established that they may work after the friction clutches 10 and 11 are completely disengaged.

As stated in the foregoing, since the power transmission device of the power-operated lawn mowing machine according to the present invention is so constructed that the prime mover shaft 7 and the rotational shaft 9 of the cutting blade 2 are made to be interconnected by the friction clutches 10 and 11 which are mutually engaged and disengaged by operation of the operating lever 24 provided at the hand grip $5_1$ of the handle 5, and the disc brakes 15 and 16 which provide braking action at the time of the clutch disengagement are provided between the movable engaging member 10 of the abovementioned clutch and the fixed braking disc 16 at the side of the prime mover, so that, even when the prime mover 3 is started, the cutting blade 2 does not rotate so far as the handle grip is firmly held.

When the operator leaves his hands off the handle 5 during the mowing operation, the rotational force from the prime mover to the cutting blade 2 is interrupted, and, at the same time, braking force is applied to the disc brake member 15 integral with the cutting blade 2, whereby the cutting blade 2 immediately stops rotation, hence it is safe, even if the operator unexpectedly touches the blade.

Since the prime mover 3 continues its rotation even after stoppage of the cutting blade 2, there is no necessity for re-starting the prime mover at every time the mowing operation is resumed, hence the machine operation is easy, the the power transmission device is very effective for this type of the power-operated lawn mowing machine.

In the above-described embodiment, the brake is applied by directly pushing down the rotational disc 15 by the balls 22. However, it is also possible to push down the rotational disc 15 in an indirect manner by the retainer 23 and other members as shown in FIGS. 6 to 9.

The embodiments shown in FIGS. 6 and 7 are in such a construction that, when the clutch lever 24 is released, the retainer 23 lowers downward against the return spring 29 by the action of the cam groove 21 and the ball 22, while it is rotating in the returning direction, and the retainer 23 urges the rotational disc 15 to the fixed braking disc 16 when the retainer 23 contacts the rotational disc 15, whereby the brake begings to work. A reference numeral 17' designates the friction member fixedly placed on the surface to the rotational disc 15 of the retainer 23.

In the case of the above-described embodiment in FIGS. 6 and 7, it is also possible to form a projection 22', in place of the ball 22, on the surface of the retainer 23 opposite to the cam plate 19 and to engage the cam groove 21 with this projection 22', as shown in FIGS. 8(I) and 8(II). FIG. 8(I) shows a state, in which the brake is released during the lawn mowing operation, and FIG. 8(II) indicates a state, in which the lawn mowing operation is stopped and the retainer 23 is lowered to work the brake.

The embodiment as illustrated in FIG. 9 is in such a construction that, when the retainer 23 rotates in the returning direction by release of the clutch lever 24, a pressing plate 32, which is interposed between the retainer 23 and the rotational disc 15 and which rotates integrally with the retainer 23, but is movable up and down by the spline 30 and urged to the ball 22 by the spring 31, is pushed downward by the ball 22. Further, this pressing plate 32 contacts with the rotating disc 15 to urge the disc to the fixed braking disc 16.

The embodiment shown in FIG. 10 is in such a construction that, in order to mount the movable engaging member 11 of the friction clutch onto the rotational shaft 9 of the cutting blade 2 in a manner to be integrally rotatable therewith and also movable in the axial direction thereof, the peripheral edge portion of the movable engaging member 11 and the flange $9_1$ integral with the rotational shaft 9 of the cutting blade are connected by a plurality of leaf springs 33 along the circumferential direction thereof, in place of the spline 12 used in the previous embodiment.

Same as mentioned above, the fixed braking disc 16 of the disc brake is also fitted hangingly by a plurality of leaf springs 34 in a manner to be movable up and down with respect to the machine body 1 so that the cam plate 19 rotates in association with the clutch lever 24 to cause the fixed braking disc 16 to move up and down through the balls 22.

FIG. 10 illustrates a state, in which the cutting blade 2 is in rotation. When the operator leaves his hands off the handle grip $5_1$, the cam plate 19 rotates by the action of the return spring to urge the fixed braking disc 16 to the rotational disc 15 through the balls 22 as shown in FIG. 11, and further to push down the rotational disc 15 and the movable engaging member 11 integral therewith.

In more detail, when the brake works and the clutch is disengaged simultaneously, the cutting blade 2 stops, while the prime mover continues its rotation. Therefore, by the use of the leaf springs 33 and 34 for mounting the movable engaging member 11 and the fixed braking disc 16 of the brake, the power transmission device in this embodiment has such advantage that frictional portion in the device is considerably reduced in comparison with the case of the spline connection, and, moreover, possible rusting and intrusion of foreign matters into the device can be avoided, so that the device can always be operated with smoothness.

FIG. 14 shows a modified embodiment of the power transmission device shown in FIG. 10, in which a plurality of sets of bushing 42 and pins 43 fitted thereinto are provided between the flange $9_1$ integral with the rotational shaft 9 of the cutting blade and the peripheral edge portion of the movable engaging member 11, in place of the leaf spring 33 in the embodiment of FIG. 10, so as to connect the movable engaging member 11 of the friction clutch to the rotational shaft 9 of the cutting blade in a manner to be integrally rotatable therewith and movable in the axial direction thereof. Small clearance or gap is provided between each set of the bushing 42 and the pin 43. A reference manual 42' is a bush holder. The abovementioned bushing 42 should preferably be made of a hard synthetic resin material.

When the movable engaging member 11 and the rotational shaft 9 of the cutting blade are connected as mentioned above, there occurs no self-excited vibration at the time of applying the brake action, hence calm operation can be secured.

The fixed braking disc 16 of the disc brake is fitted hangingly onto the machine body 1 in a manner to be movable up and down by a rubber damper 44 used in place of the leaf spring 34 in the embodiment shown in FIG. 10.

The foregoing explanations have been made with respect to the rotary type lawn mowing machine, although it should be appreciated that the power transmission device according to the present invention can also be applied to the reel type power-operated lawn mowing machine.

What is claimed is:

1. A power transmission device for power-operated lawn mowing machine, which comprises in combination:
   (a) a machine body;
   (b) a prime mover mounted on one part of said machine body;
   (c) a rotational shaft for said prime mover;
   (d) a concentric shaft rotatably fitted around said rotational shaft for the prime mover at the bottom part thereof;
   (e) a cutting blade fixedly secured to said concentric rotational shaft;
   (f) a pair of frictional clutch means, one of which is fixedly secured to said prime mover shaft, and the other of which is fixed onto the concentric rotational shaft around said prime mover shaft in a manner to be integrally rotatable with said concentric rotational shaft and movable in the axial direction of said shaft;
   (g) spring means to urge said rotational clutch means upward toward said fixed clutch means;
   (h) disc brake means fixedly secured to said movable engaging member of said pair of clutch means;
   (i) a cam plate fixed around said prime mover shaft in a rotatable manner;
   (j) a fixed braking disc secured to said cam plate;
   (k) a plurality of circumferential grooves formed in the surface part of said cam plate facing said disc brake means;
   (l) retainer means to hold therein a plurality of protruded members to be engaged with said cam grooves, said retainer means being provided between said cam plate and said rotational disc brake means, and being connected with an operating lever through a flexible wire for engaging and disengaging said clutch means;
   (m) a drive pulley provided on said prime mover shaft and a driven pulley provided on one part of a wheel axle; and
   (n) a pulley belt extended between said drive and driven pulleys.

2. The power transmission device as set forth in claim 1, in which said prime mover shaft and said rotational shaft of the cutting blade are interlocked by said frictional clutch means to be engaged and disengaged by said operating lever.

3. The power transmission device as set forth in claim 1, in which said disc brake means is provided between said rotational clutch member and said fixed clutch member so as to effect braking function at the time of separation of the clutch separation.

4. The power transmission device as set forth in claim 1, in which said plurality of protruded members in said retainer means are balls.

5. The power transmission device as set forth in claim 1, in which said plurality of protruded members in said retainer means are projections formed on the surface of said retainer means facing said cam plate so as to be engaged with said cam grooves.

6. The power transmission device as set forth in claim 1, in which a pressing plate is interposed between said retainer means and said rotatable clutch means to rotate integrally with said retainer means, and movable up and down by a spline and urged to the protruded members by a spring, said pressing plate being pushed downward by said protruded members when said retainer means rotates in its returning direction.

7. The power transmission device as set forth in claim 1, in which the peripheral edge portion of said rotatable clutch member is connected with a flange integral with the concentric rotatable shaft by a plurality of leaf springs.

8. The power transmission device as set forth in claim 1 or 6, in which the peripheral edge portion of said rotatable clutch member is connected with a flange integral with the concentric rotatable shaft by a plurality of sets of bushings and pins fitted thereinto.

* * * * *